United States Patent
Binder et al.

(10) Patent No.: US 12,341,364 B2
(45) Date of Patent: Jun. 24, 2025

(54) FLASH CHARGING PARALLEL BATTERY PACKS SEPARATED BY A HIGH RESISTANCE INTERCONNECT

(71) Applicant: Microsoft Technology Licensing, LLC, Redmond, WA (US)

(72) Inventors: Julian Arlo Binder, Redwood City, CA (US); Brian Jonathan Loh, San Francisco, CA (US); Meera Radhakrishnan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 741 days.

(21) Appl. No.: 17/703,144

(22) Filed: Mar. 24, 2022

(65) Prior Publication Data
US 2023/0307926 A1 Sep. 28, 2023

(51) Int. Cl.
*H02J 7/00* (2006.01)
*G02B 27/01* (2006.01)

(52) U.S. Cl.
CPC .......... *H02J 7/0018* (2013.01); *H02J 7/0042* (2013.01); *H02J 7/0048* (2020.01); *H02J 7/00714* (2020.01); *G02B 27/017* (2013.01); *H02J 2207/20* (2020.01)

(58) Field of Classification Search
None
See application file for complete search history.

(56) References Cited

U.S. PATENT DOCUMENTS

| | | | |
|---|---|---|---|
| 2012/0153899 A1* | 6/2012 | Marschalkowski | H02J 7/0025 320/118 |
| 2015/0362944 A1* | 12/2015 | Sporck | H02M 1/00 323/303 |
| 2017/0163060 A1 | 6/2017 | Zheng et al. | |
| 2021/0376644 A1 | 12/2021 | Yang | |

FOREIGN PATENT DOCUMENTS

EP  3700047 A2  8/2020

OTHER PUBLICATIONS

"International Search Report and Written Opinion Issued in PCT Application No. PCT/US22/053952", Mailed Date: Apr. 24, 2023, 14 Pages. (Ms# 411219-WO-PCT).

* cited by examiner

*Primary Examiner* — Richard Isla
*Assistant Examiner* — Ryu-Sung P. Weinmann
(74) *Attorney, Agent, or Firm* — Workman Nydegger

(57) ABSTRACT

A multi-battery flash charging system is described herein. The system is configured to reduce a power charging loss at a battery-operated device. This device includes multiple, distributed batteries. The process of reducing the power charging loss at the battery-operated device is achieved by generating a charge voltage at a charge voltage regulator that is required to be located externally relative to a housing of the battery-operated device. Reducing the power charging loss at the battery-operated device is further achieved by transmitting the charge voltage over a high resistance wire that couples the charge voltage regulator to the battery-operated device.

20 Claims, 9 Drawing Sheets

FLASH CHARGING PARALLEL BATTERY PACKS SEPARATED BY A HIGH RESISTANCE INTERCONNECT

BACKGROUND

Flash charging refers to a technique that increases the speed by which a battery (aka "battery unit" or "battery pack") can be charged. To implement a flash charging technique, a power adapter typically monitors an input charging voltage and sets that voltage to a level slightly higher than the battery's current voltage level. As the battery is charged, the power adapter periodically reviews the voltage levels and might increase the input charging voltage level as the battery's voltage increases.

Flash charging is highly beneficial because battery-operated devices can now be charged in under an hour. In some instances, the battery can be sufficiently charged in as little as about 15 to 30 minutes.

While both normal and flash charging do have many benefits, they also have a number of drawbacks. For instance, it is often the case that the battery-operated device becomes quite hot while it is being charged (e.g., under non-flash charging scenarios). If the device is a wearable device, such as perhaps a head-mounted device (HMD), then users often stop wearing the device because the temperature of the device becomes uncomfortable. As a result, charging can negatively impact the runtime of the device. Another drawback with regard to flash charging is that flash charging requires a custom charging adapter.

Flash charging is traditionally used only for single battery devices. Although the single battery can be charged rapidly using flash charging techniques, the runtime and perhaps even the computational abilities of the device might be limited due to use of only a single battery. What is needed, therefore, is an improved technique for performing flash charging, where that technique can be applied to a broader range of device types.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to a multi-battery flash charging system configured to reduce a power charging loss at a battery-operated device that includes multiple, distributed batteries. Reducing the power charging loss at the battery-operated device is achieved by generating or regulating a charge voltage at a charge voltage regulator, which is located externally relative to a housing of the battery-operated device, and by transmitting the charge voltage over a high resistance wire that couples the charge voltage regulator to the battery-operated device.

Some embodiments include a battery-operated device comprising a first linear charger collocated with and coupled to a first battery unit of the battery-operated device and further comprising a second linear charger collocated with and coupled to a second battery unit of the battery-operated device. The second battery unit is separated from the first battery unit within a housing of the battery-operated device. As a consequence, the first battery unit and the second battery unit are distributed relative to one another in the housing. The embodiments further include a flash charger comprising a charge voltage regulator. The flash charger is pluggable into a power grid to provide a rapid charging voltage to the battery-operated device to rapidly charge the first and second battery units. The flash charger, which includes the charge voltage regulator, is located externally relative to the housing of the battery-operated device. The embodiments further include a high resistance wire that is detachable from the battery-operated device and that, when attached to the battery-operated device, is coupled to (i) the first linear charger, (ii) the second linear charger, and (iii) the charge voltage regulator. The rapid charging voltage is delivered from the externally located charge voltage regulator to the first linear charger and to the second linear charger via the high resistance wire.

Some embodiments are configured to rapidly charge the battery-operated device. Such embodiments determine that the charge voltage regulator, which is located externally relative to the housing, is connected to the battery-operated device. The high resistance wire couples the charge voltage regulator to a first linear charger that is collocated with and coupled to a first battery unit. The high resistance wire further couples the charge voltage regulator to a second linear charger that is collocated with and coupled to a second battery unit. The first battery unit and the second battery unit are both disposed within the housing of the battery-operated device but are distributed relative to one another. In response to determining that a difference between a state of charge (SOC) of the first battery unit and a SOC of the second battery unit exceeds a threshold, the embodiments determine that the first battery unit is less charged than the second battery unit. The embodiments also negotiate a first charge voltage that will be used to charge the first battery unit by causing a charge controller, which is included in the battery-operated device, to instruct the charge voltage regulator to provide the first charge voltage over the high resistance wire to the first linear charger, which then provides the first charge voltage to the first battery unit. The embodiments then charge the first battery unit using the first charge voltage until the difference between the SOC of the first battery unit and the SOC of the second battery unit no longer exceeds the threshold.

On the other hand, in response to determining that the difference between the SOC of the first battery unit and the SOC of the second battery unit does not exceed the threshold such that the SOC of the first battery unit and the SOC of the second battery unit are substantially balanced, the embodiments negotiate a second charge voltage that will be used to charge both the first battery unit and the second battery unit in parallel. After the first battery unit and the second battery unit are charged for a determined period of time using the second charge voltage, the embodiments check charge currents that are being delivered to the first battery unit and to the second battery unit. In response to checking the charge currents, the embodiments cause the charge controller to renegotiate with the charge voltage regulator to select a third charge voltage, where the third charge voltage is selected based on whichever charge current is lower as between the first battery unit and the second battery unit. The embodiments use the third charge voltage to charge, in parallel, the first battery unit and the second battery unit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
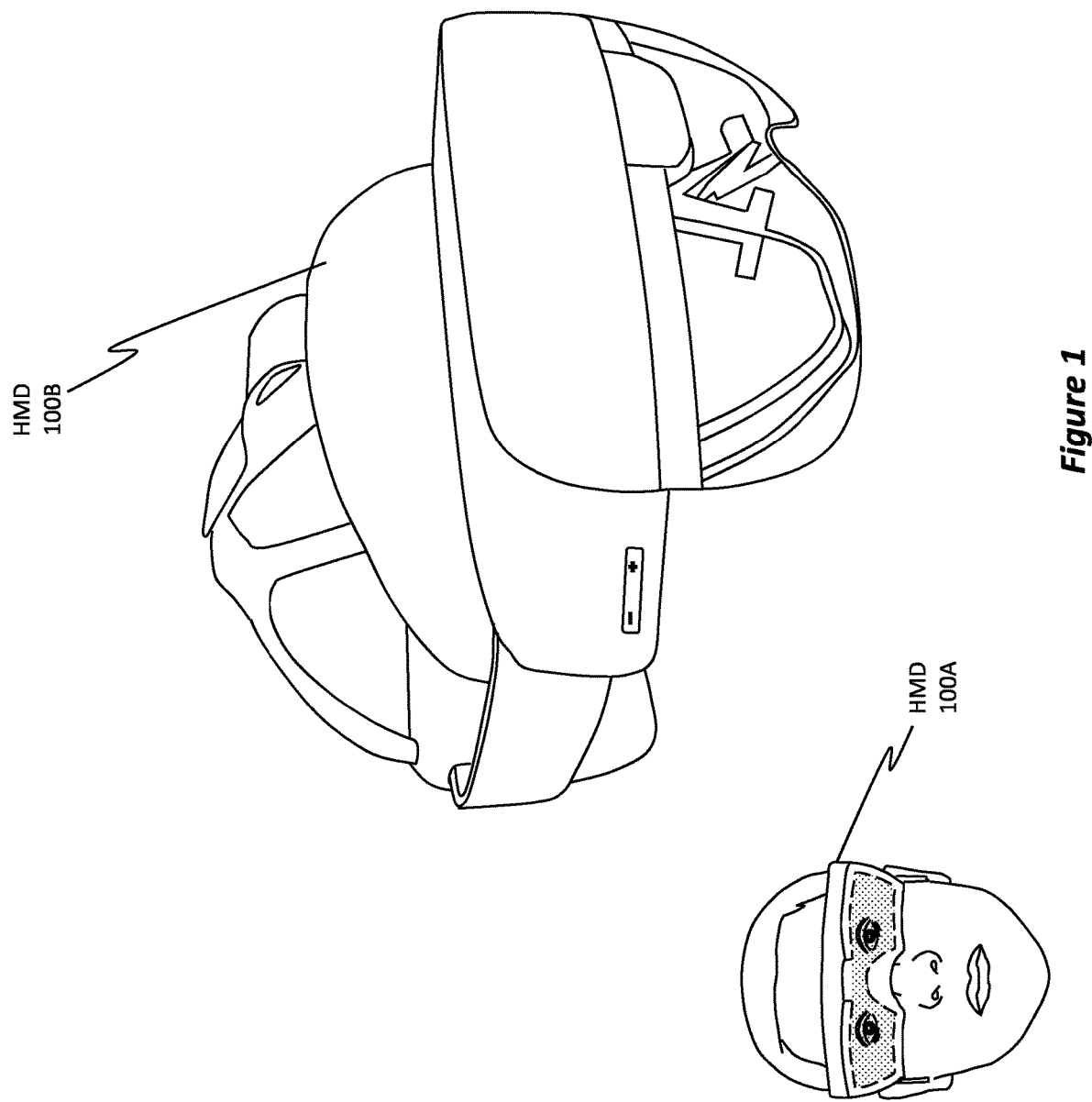
FIG. 1 illustrates an example of a multi-battery device.

Embodiments disclosed herein relate to a multi-battery (e.g., lithium ion batteries) flash charging system configured to reduce a power charging loss at a battery-operated device that includes multiple, distributed batteries. Reducing the power charging loss at the battery-operated device is achieved by generating or regulating a charge voltage at a charge voltage regulator, which is located externally relative to a housing of the battery-operated device, and by transmitting the charge voltage over a high resistance wire that couples the charge voltage regulator to the battery-operated device.

The following descriptions use labels such as "first," "second," "third," and so on, particularly with regard to describing various voltages. It should be noted that such labels are provided for distinction purposes only and should not be viewed as indicating a sequential relationship.

Some embodiments are directed to a battery-operated device comprising a first linear charger, a first battery unit, a second linear charger, and a second battery unit. The second battery unit is separated from the first battery unit within a housing of the battery-operated device. The embodiments further include a flash charger comprising a charge voltage regulator. The flash charger is pluggable into a power grid to provide a rapid charging voltage to rapidly charge the first battery unit and the second battery unit. The flash charger, which includes the charge voltage regulator, is located externally relative to the housing. The embodiments further include a high resistance wire that is detachable from the battery-operated device and that, when attached to the battery-operated device, is coupled to (i) the first linear charger, (ii) the second linear charger, and (iii) the charge voltage regulator. The rapid charging voltage is delivered from the externally located charge voltage regulator to the first linear charger and to the second linear charger via the high resistance wire.

Some embodiments are configured to rapidly charge the battery-operated device. Such embodiments determine that the charge voltage regulator, which is located externally relative to the housing, is connected to the battery-operated device. The high resistance wire couples the charge voltage regulator to the first linear charger and to the second linear charger. The first battery unit and the second battery unit are both disposed within the housing of the battery-operated device but are distributed relative to one another. In response to determining that a difference between a state of charge (SOC) of the first battery unit and a SOC of the second battery unit exceeds a threshold, the embodiments determine that the first battery unit is less charged than the second battery unit. The embodiments also negotiate a first charge voltage that will be used to charge the first battery unit by causing a charge controller, which is included in the battery-operated device, to instruct the charge voltage regulator to provide the first charge voltage over the high resistance wire to the first linear charger, which then provides the first charge voltage to the first battery unit. The embodiments then charge the first battery unit using the first charge voltage until the difference between the SOC of the first battery unit and the SOC of the second battery unit no longer exceeds the threshold.

On the other hand, in response to determining that the difference between the SOC of the first battery unit and the SOC of the second battery unit does not exceed the threshold such that the SOC of the first battery unit and the SOC of the second battery unit are substantially balanced, the embodiments negotiate a second charge voltage that will be used to charge both the first battery unit and the second battery unit. After the first battery unit and the second battery unit are charged for a determined period of time using the second charge voltage, the embodiments check charge currents that are being delivered to the first battery unit and to the second battery unit. In response to checking the charge currents, the embodiments cause the charge controller to renegotiate with the charge voltage regulator to select a third charge voltage, where the third charge voltage is selected based on whichever charge current is lower as between the first battery unit and the second battery unit. The embodiments use the third charge voltage to charge, in parallel, the first battery unit and the second battery unit.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about many benefits, advantages, and improvements over the traditional technology. Traditional charging technologies place the charge voltage regulator within the housing of the device, often near that device's battery units. As the batteries charge, however, those batteries typically become quite hot. In some cases, the temperature of the device increases so high that the device becomes uncomfortable for a user to hold or wear (e.g., such as a head-mounted device (HMD)). As a consequence, the user typically would not hold or wear the device while the device was being charged, thereby resulting in less time the user could use the device. Traditional flash charging technologies require a custom charging adapter.

The disclosed embodiments structure the hardware of the charging system in a different manner than what is done traditionally in order to achieve various benefits and advantages. In particular, the charge voltage regulator is now placed at a location external to the housing of the device. Furthermore, a high resistance wire now connects the externally placed charge voltage regulator to the device so the device can be charged. By structuring the hardware in this manner, the temperature profile of the device remains relatively stable, static, or constant, even when it is being charged. As a result, the user can continue to wear or hold the device while it is being charged, thereby increasing the amount of use time for the device.

Often, to charge a device, an input voltage (e.g., perhaps between about 5 V and 9 V or sometimes between 2.6 V to about 4.4 V) is provided from a power supply. The charge voltage regulator (e.g., a DC-to-DC converter) regulates the input voltage to the battery. It is often the case that there is between about a 5% to 25% efficiency loss (resulting in increases in temperature) inside the charge voltage regulator. The disclosed embodiments remove the regulation from occurring within the housing of the device and cause the regulation to now occur externally relative to the housing. Doing so significantly improves the charging operations of the battery units, allows for better control of the charging process, and even improves runtime of the device (e.g., prolonged runtime). For instance, the runtime is improved because of the thermal operating margins or specific conditions when the device is running off of a cable.

Traditional flash charging or rapid charging techniques (e.g., where a device is charged in under an hour or so) are also limited to one battery per device scenarios. The disclosed embodiments, on the other hand, are specifically focused on a multi-battery device that can be charged rapidly. By including multiple batteries on the device, the device can be used longer as compared to single battery devices. Also, by including multiple batteries on the device, the compute abilities of the device can be increased (e.g., high compute processes can be performed). The disclosed embodiments are focused on techniques that efficiently and rapidly charge multiple batteries, thereby improving the functionality of the device itself.

As another benefit, the embodiments are able to dynamically adjust the input voltage that is being regulated by the flash charger based upon what the voltages at the batteries actually are and what the charge currents are. In a scenario where the states of charge (SOC) between the batteries are imbalanced, the embodiments can emphasize charging the lower charged battery first until the SOCs are substantially balanced. Once the SOCs are balanced, then the battery units can be charged in parallel.

As yet another benefit, the embodiments are able to maintain an absolute minimum headroom for the linear charges and battery units. The term "headroom" generally refers to the maximum charging power that the supply is able to deliver minus the maximum charging power that the battery unit can actually absorb. A linear charger uses a pass transistor to modulate the resistance of a device in order to further control the charge voltage and charge current. The embodiments are able to maintain a headroom between about 25 milli-volts to 50 milli-voltages above the battery's voltage. Doing so allows the linear charger to remain fully on so there will be little to no loss during the charging process for the linear charger. The embodiments are able to accurately set the charging voltage at the charge voltage regulator in a manner so that the charging voltage is maintained at a high enough voltage to enable the multiple linear chargers to fully operate.

Accordingly, the embodiments beneficially expand or improve the scope of flash or rapid charging techniques by being able to simultaneously charge multiple battery units. The embodiments also beneficially improve distributed battery charging technologies by shifting power losses away from occurring within the housing of the device to now occurring externally relative to the housing, resulting in improved temperature profiles and runtimes.

Battery-Operated Devices

Attention will now be directed to FIGS. 1, 2, 3, and 4, which provide various illustrations regarding a type of battery-operated device. Although these figures are specifically focused on a head-mounted device (HMD), one will appreciate how the disclosed principles can be implemented with any type of battery-operated device, provided that device has a distributed battery system, as will be described in more detail shortly. Indeed, any type of smart phone, tablet, laptop, or any other type of multi-battery operated device can be used.

Figure 2:
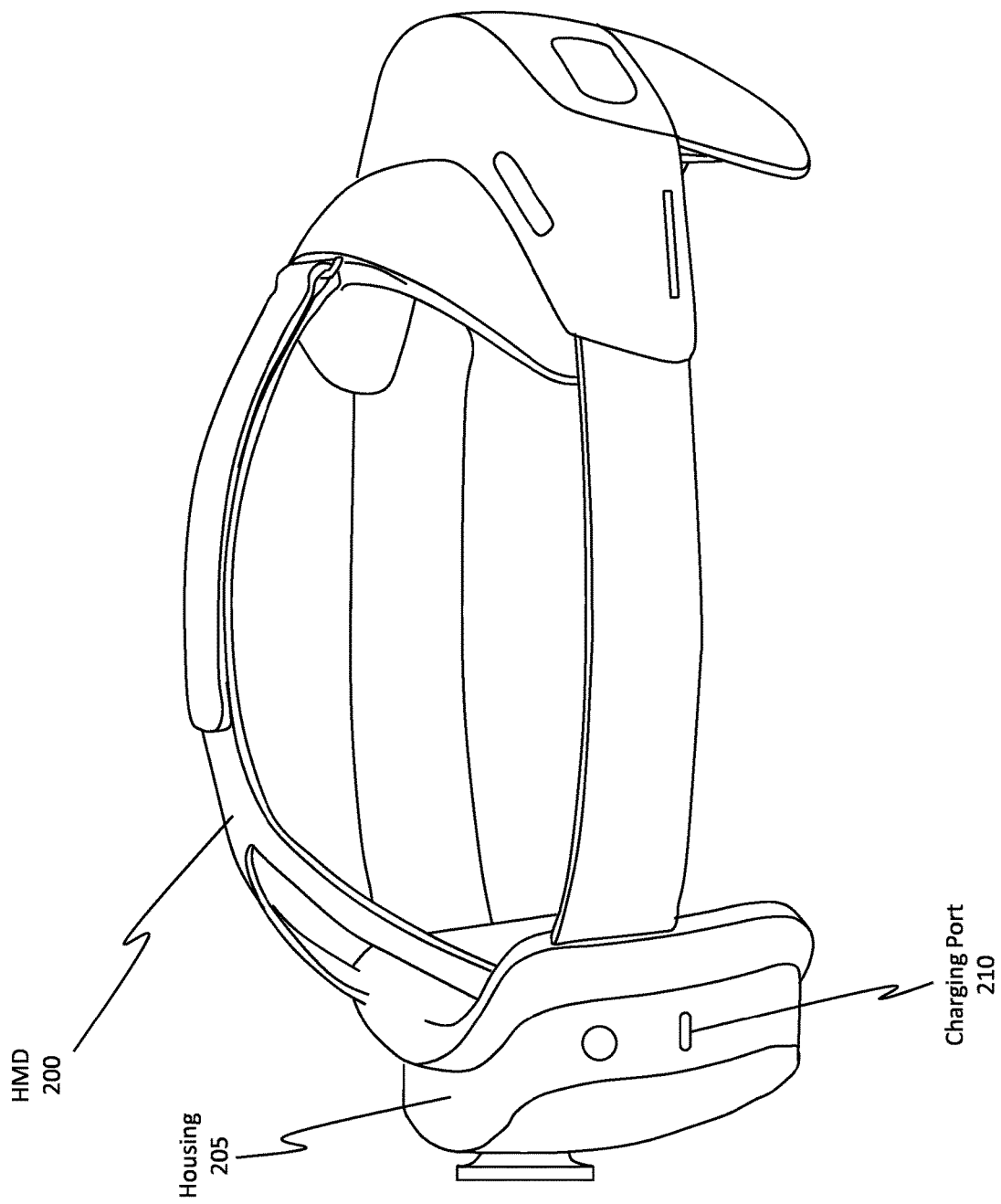
FIG. 2 illustrates a different perspective view of the device.

FIG. 1 shows an HMD 100A and an HMD 100B. These HMDs are examples of wearable devices that can be used to render and display a mixed-reality (MR) environment for a user. FIG. 2 shows an HMD 200, which is representative of the HMDs in FIG. 1, but from a different perspective. Notice, the HMD 200 includes a housing 205 as well as a charging port 210.

Figure 3:
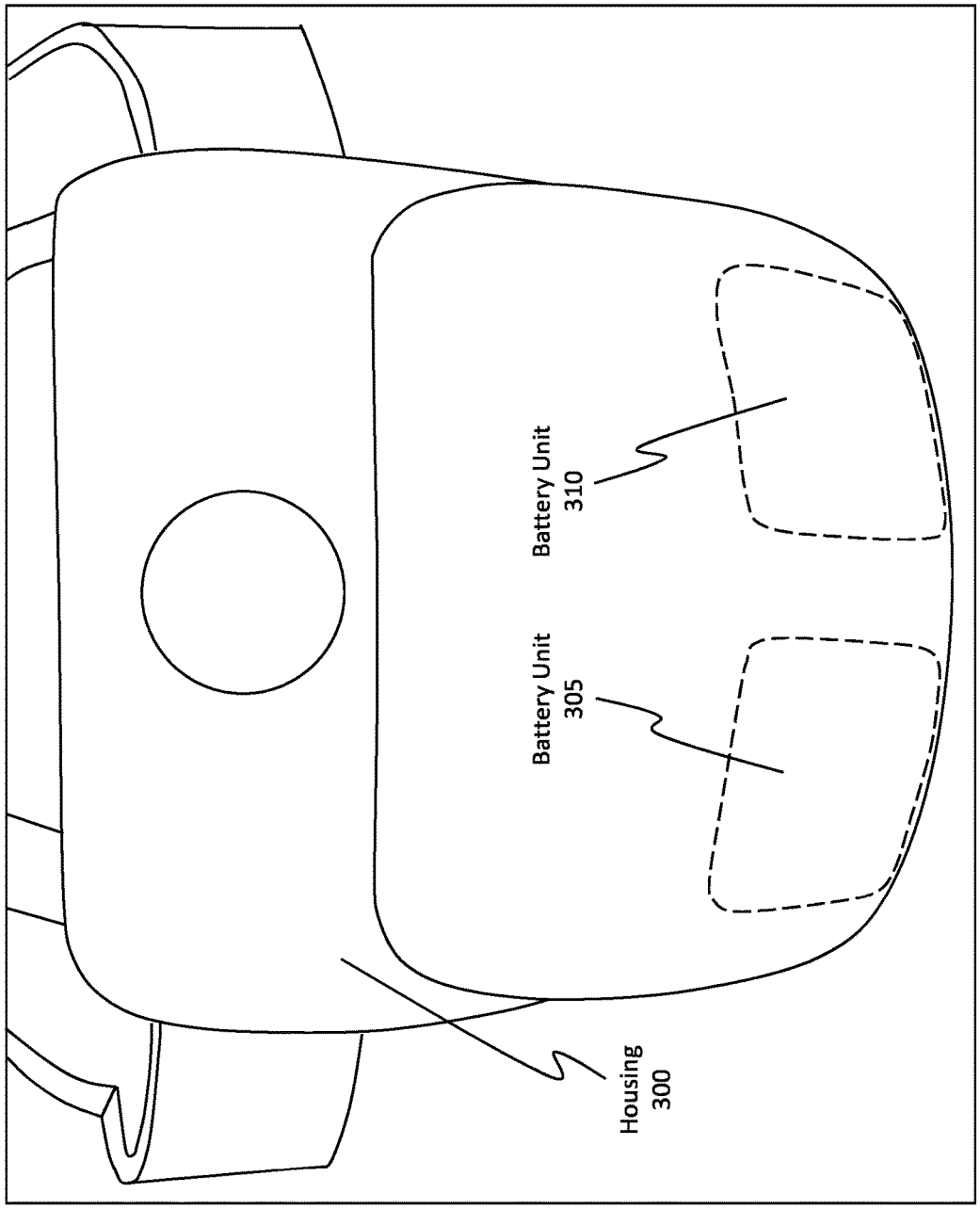
FIG. 3 illustrates how the device includes multiple, distributed battery units.

FIG. 3 shows a housing 300, which is representative of the housing 205 from FIG. 2. The perspective shown in FIG. 3 is from the rear side of the HMD. Located within the housing 300 is a set of two or more battery units, as shown by battery unit 305 and battery unit 310. Although FIG. 3 shows only two battery units, the number of battery units can be greater than 2. For instance, the number of battery units can be 2, 3, 4, 5, 6, 7, 8, 9, 10, or even more than 10.

Also, the placement or location of the battery units can vary and need not be at the specific locations illustrated in FIG. 3. In some instances, one or more battery units can be located along the headbands of the HMD or can perhaps be located on the visor portion of the HMD. Accordingly, the placement of the battery units 305 and 310 is provided simply for example purposes only and should not be view as being binding in any way. Although not illustrated in these figures, a high resistance wire can be used to couple these battery units.

Notice, the battery unit 305 is separate and distinct from the battery unit 310. Furthermore, the two battery units are separated from one another by some distance. As a result, the battery units 305 and 310 can be considered to be "distributed" relative to one another within the housing 300 of the HMD. Accordingly, the disclosed principles are primarily operable in circumstances where a device includes multiple battery units and where those battery units are separated from, or are distributed relative to, one another within the device's housing.

Figure 4:
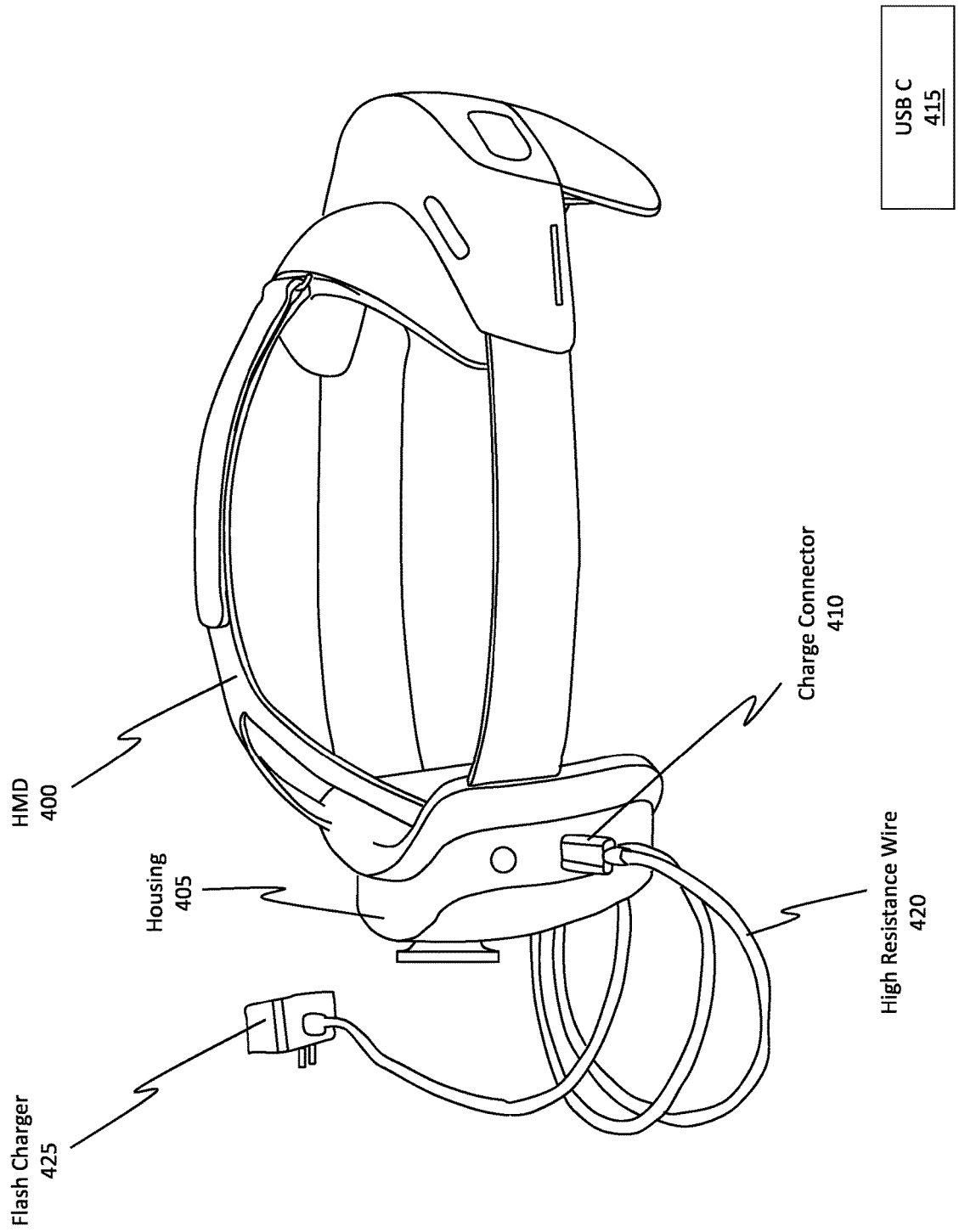
FIG. 4 illustrates a multiple battery, flash/rapid charging system that includes a flash charger and a multi-battery device, where a high resistance wire connects the flash charger to the device.

FIG. 4 shows an HMD 400, which is representative of the HMDs discussed thus far. HMD 400 includes a housing 405 that includes multiple, distributed battery units. As mentioned previously, the housing 405 includes a charging port (e.g., charging port 210 from FIG. 2) in which a charge connector 410 can be plugged. In some cases, the charge connector 410 can be a universal serial bus (USB) C 415 type of connector. In other cases, the charge connector 410 can be any other type of serial connector. The connector can also include a PCB, flex PCB, or any other type of bus.

The charge connector 410 is coupled to a high resistance wire 420, which is also coupled to a flash charger 425. By "coupled," it is meant that a closed circuit or connection exists between two or more elements. "Coupled" does not necessarily mean a direct connection or contact exists between the elements. As an example, a battery is "coupled" to a light emitting diode (LED) when one end of an unbroken wire is connected to the battery and when the other end of the unbroken wire is connected to the LED. Although the battery is not in direct contact with the LED, the wire enables the battery and the LED to be "coupled" to one another.

In some instances, the high resistance wire 420 can be coupled to the HMD 400 (e.g., an example of a battery-operated device) via a USB C 415 connector, or any other connector, as mentioned above.

The flash charger 425 is able to use flash charging technology to rapidly charge the HMD 400. Notably, the charge connector 410, and hence the flash charger 425, can be decoupled from the HMD 400.

As will be described later, the HMD 400 can be charged even while the HMD 400 is being used by a user. Traditional HMDs, on the other hand, would become too hot for a user to wear while the HMD was being charged. This increase in temperature was due to the hardware configurations of the charging components. The disclosed embodiments, however, are configured in a manner so that the temperature profile of the HMD remains relatively constant, even during charging. As a result, the HMD 400 can be worn while the HMD 400 is being charged using the flash charger 425.

Stated differently, the temperature profile can remain relatively constant by regulating the charging voltage through the use of a unit that is located externally relative to the housing of the HMD. As a result of regulating the rapid charging voltage externally relative to the housing of the battery-operated device, the temperature profile of the battery-operated device has a smaller temperature gradient as compared to a temperature profile of a different or traditional device in which that device's rapid charging voltage is regulated within the housing of that device. Further details on these aspects will be provided later.

Example Charger Component Configuration

Figure 5:
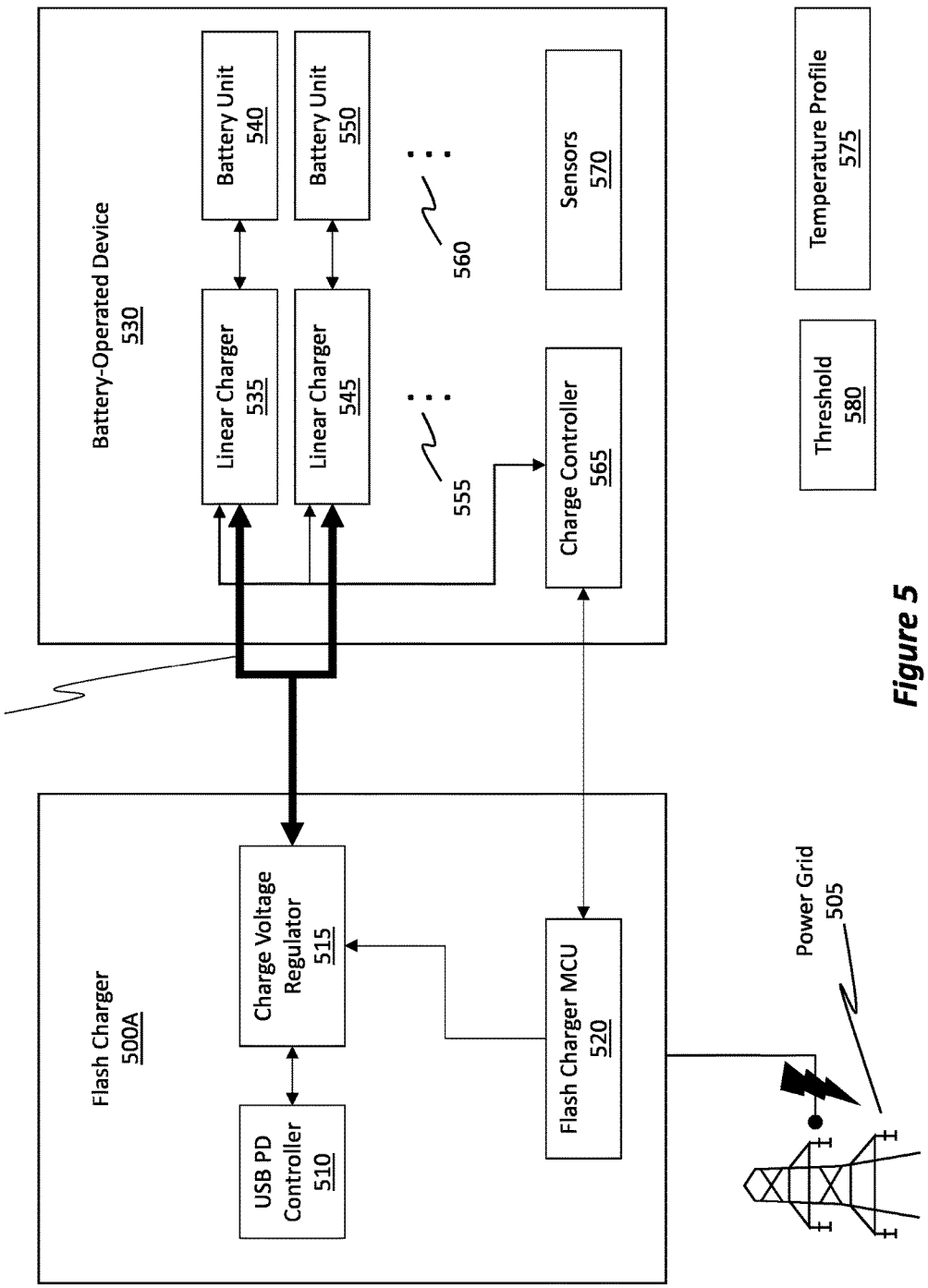
FIG. 5 illustrates an architectural diagram of the multiple battery, flash/rapid charging system.

FIG. 5 shows a multi-battery flash charging system 500 that includes a flash charger 500A, which is representative of the flash charger 425 from FIG. 4. The flash charger 500 is connectable to a power grid 505. The flash charger 500 includes a USB power deliver (PD) controller 510, a charge voltage regulator 515 (e.g., a direct current (DC)-to-DC converter), and a flash charger microcontroller unit (MCU) 520. Of course, the flash charger 500 might include other components as well.

Notice, the charge voltage regulator 515 is located externally relative to the housing of the device. The charge voltage regulator 515 regulates the voltage received from the power grid 505 to a selected level in order to charge the device, thereby generating a so-called "rapid charging voltage." In doing so, the charge voltage regulator 515 typically has about a 5% to 25% efficiency loss when generating the rapid charging voltage, and this loss results in an increase in temperature.

A high resistance wire 525, which is representative of the high resistance wire 420 from FIG. 4, connects the flash charger 500 to a battery-operated device 530, which is representative of any of the HMDs discussed thus far. In some implementations, a resistance of the high resistance wire 525 is greater than 50 milli-ohms. In some cases, the resistance is greater than 75 milli-ohms. In some cases, the resistance is about 100 milli-ohms. In some cases, the resistance is within a range of resistances spanning between 50 milli-ohms and about 150 milli-ohms.

In accordance with the disclosed principles, the battery-operated device 530 includes a first linear charger 535 that is collocated with and that is coupled to a first battery unit 540. The battery-operated device 530 further includes a second linear charger 545 that is collocated with and that is coupled to a second battery unit 550. The battery-operated device 530 can include any number of linear chargers and corresponding battery units, as shown by the ellipsis 555 and 560, respectively.

Notice, the high resistance wire 525 couples the charge voltage regulator 515 in the flash charger 500 to the linear chargers 535 and 545 in the battery-operated device 530. As mentioned previously, the linear chargers regulate charge voltage and/or current provided to the battery by modulating a resistance of a pass device.

The battery-operated device 530 also includes a charge controller 565. This charge controller 565 can communicate with the flash charger MCU 520 as well as with the linear chargers 535 and 545. In some cases, an additional wire (e.g., a sideband scheme) is provided to enable communication between the flash charger MCU 520 and the charge control 565 (e.g., as shown by the line connecting the flash charger MCU 520 and the charge controller 565). In other cases, however, the high resistance wire 525 can be used to facilitate the communication, and the power charging and communication operations occur out of band relative to one another. Further details on this aspect will be provided later.

The charge controller 565 generally controls the charging rate and conditions between the flash charger 500 and the battery-operated device 530. As will be described in more detail later, the charge controller 565 can determine when charging will occur, when charging will stop, which battery units will be charged, the charging voltage that is provided, and so on. The charge controller 565 is able to continuously monitor the input charging voltage and adjust that voltage based on the loss that occurs over the high resistance wire and based on conditions occurring at the battery units.

The battery-operated device 530 can further include any number of sensors 570 to monitor conditions of the battery units 540 and 550. The sensors 570 can monitor the temperature levels of the battery units 540 and 550, the voltage levels, as well as the current levels. A temperature profile 575 of the battery unit 540 and of the battery unit 550 can also be determined based on the information obtained using the sensors 570. Optionally, the charging rate of the battery-operated device 530 can be modified to ensure the temperature profile 575 does not exceed a temperature threshold or does not undergo a rapid change in temperature (e.g., a rate of change that exceeds a rate threshold).

Various thresholds can also be defined, as represented by threshold 580. As will be discussed in more detail later, the threshold 580 can represent a threshold difference between various SOCs.

Accordingly, in some embodiments, a multi-battery flash charging system can include a first set of sensors that monitors a first voltage of the first battery unit, a first current of the first battery unit, and a first temperature of the first battery unit. The multi-battery flash charging system can further include a second set of sensors that monitors a second voltage of the second battery unit, a second current of the second battery unit, and a second temperature of the second battery unit.

Figure 6:
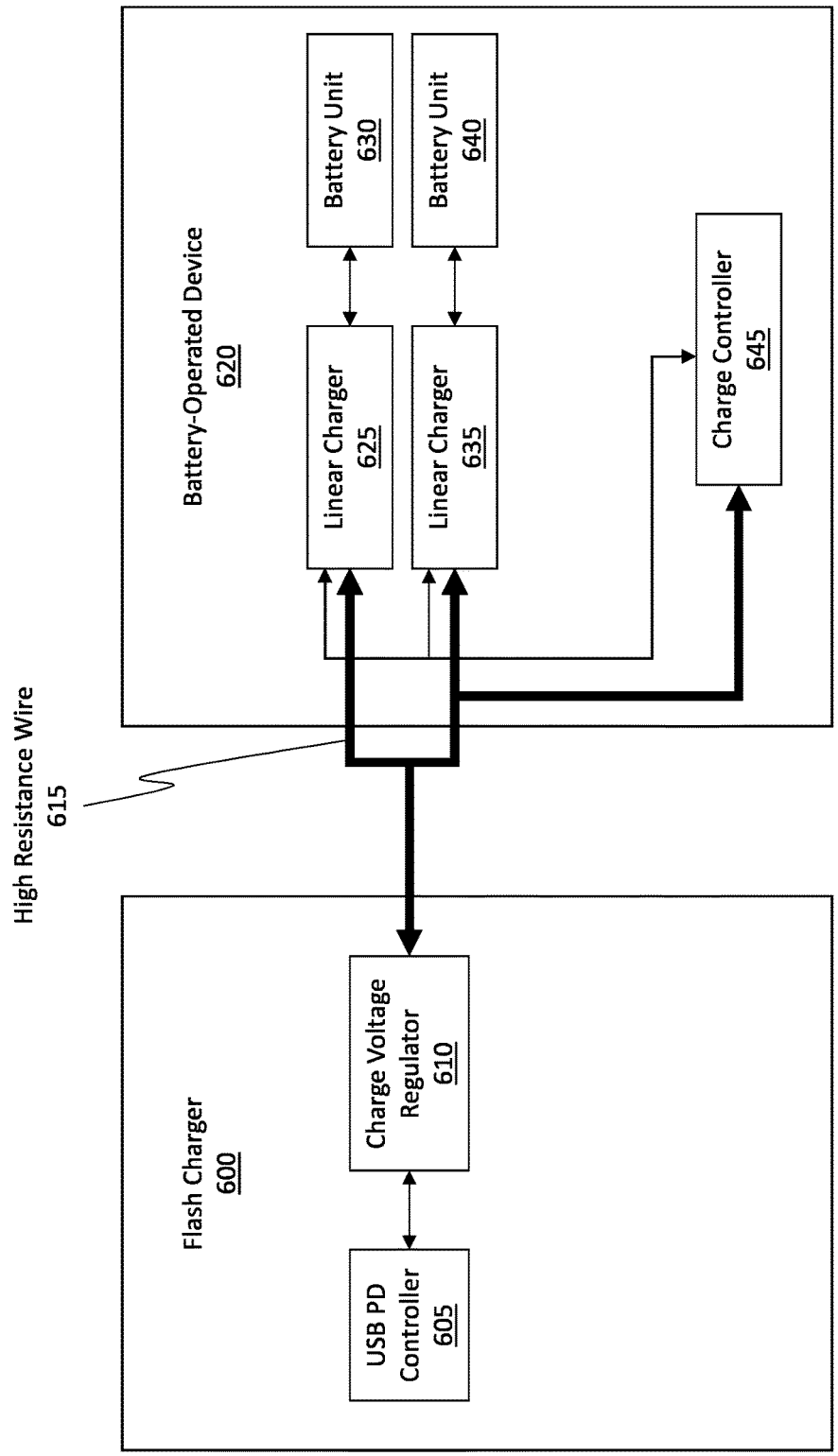
FIG. 6 illustrates another architectural diagram of the system.

FIG. 6 shows another embodiment that uses the high resistance wire as a communication interface. Specifically, FIG. 6 shows a flash charger 600 that includes a USB PD controller 605 and a charge voltage regulator 610. A high resistance wire 615 connects the flash charger 600 to a battery-operated device 620.

The battery-operated device 620 includes a first linear charger 625, a first battery unit 630, a second linear charger 635, and a second battery unit 640. The battery-operated device 620 further includes a charge controller 645. In this example configuration, the charge controller 645 uses the high resistance wire 615 to control and to communicate with the charge voltage regulator 610 as opposed to using a separate wire for communication. With the configuration shown in FIG. 6, the embodiments periodically alternate between using the high resistance wire 615 to charge the battery-operated device 620 and using the high resistance wire 615 as a communication interface between the charge controller 645 and the flash charger 600 (i.e. they operate out of band relative to one another).

Accordingly, the Figures have described a multi-battery flash charging system configured to reduce a power charging loss at a battery-operated device that includes multiple, distributed batteries. Reducing the power charging loss at the battery-operated device is achieved by generating or regulating a charge voltage at a charge voltage regulator, which is located externally relative to a housing of the battery-operated device, and by transmitting the charge voltage over a high resistance wire that couples the charge voltage regulator to the battery-operated device.

The multi-battery flash charging system comprises a battery-operated device, a flash charger, and a high resistance wire.

The battery-operated device includes a first linear charger collocated with and coupled to a first battery unit of the battery-operated device. The battery-operated device further includes a second linear charger collocated with and coupled to a second battery unit of the battery-operated device. The second battery unit is separated from the first battery unit within a housing of the battery-operated device. As a consequence, the first battery unit and the second battery unit are distributed relative to one another in the housing of the battery-operated device.

The flash charger includes a charge voltage regulator. The flash charger is pluggable into a power grid to provide a rapid charging voltage to the battery-operated device to rapidly charge the first battery unit and the second battery unit. The flash charger, which includes the charge voltage regulator, is located externally relative to the housing of the battery-operated device. With this configuration, tempera-ture increases that might occur due to the efficiency loss of the charge voltage regulator occur at a location external to the housing of the device.

The high resistance wire is detachable from the battery-operated device. When it is attached to the battery-operated device, the high resistance wire is coupled to (i) the first linear charger, (ii) the second linear charger, and (iii) the charge voltage regulator. The rapid charging voltage is delivered from the externally located charge voltage regulator to the first linear charger and to the second linear charger via the high resistance wire.

Figure 7:
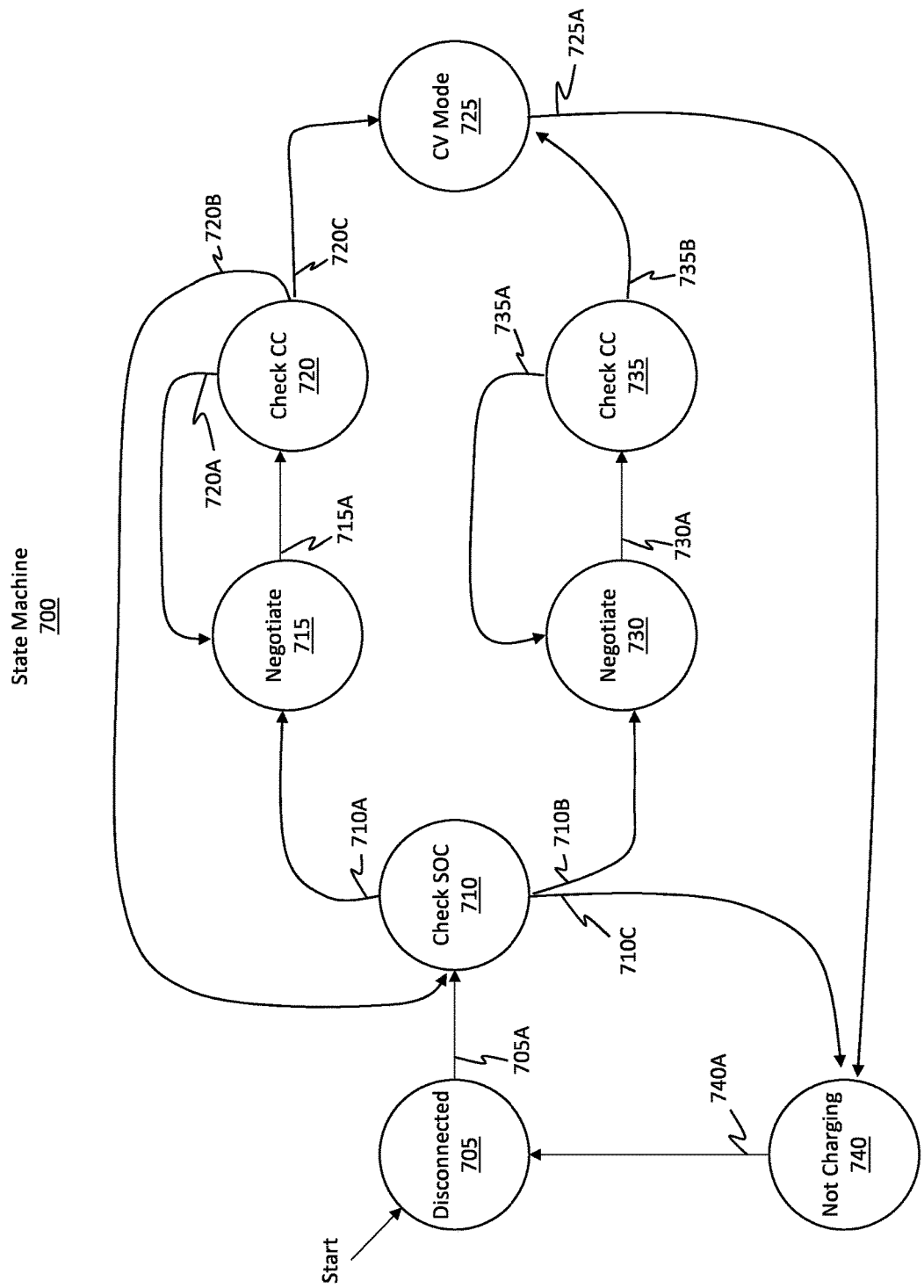
FIG. 7 illustrates a state machine describing the behavior of the multiple battery, flash/rapid charging system.

Having just described some of the hardware configurations of the disclosed embodiments, attention will now be directed to FIG. 7, which illustrates a state machine describing some of the behaviors of the disclosed embodiments.

State Machine Behavioral Description

FIG. 7 illustrates an example state machine 700 modeling the behavior of the system, which includes a flash charger (e.g., flash charger 500 of FIG. 5) and a battery-operated device (e.g., battery-operated device 530). The initial state starts at the disconnected 705 state in which the battery-operated device is disconnected from the flash charger. Stated differently, the high resistance wire is not currently coupling the two devices together.

In response to input 705A, which refers to an input indicating that the high resistance wire now couples the battery-operated device to the flash charger, the state machine 700 transitions from the disconnected 705 state to a state where the system checks the state of charge (SOC) 710 of the batteries in the battery-operated device.

When input 710A is acquired, then the state machine 700 follows the top branch. When input 710B is acquired, then the state machine 700 follows the bottom branch.

Input 710A includes an input indicating that there is an SOC difference between the first and second battery units, where this SOC difference exceeds a threshold value (e.g., the difference in SOCs might exceed a 5% difference). In this regard, the states of charge between the two batteries are unbalanced.

On the other hand, input 710B includes an input indicating that the SOC difference does not exceed the threshold. In other words, the states of charge between the two batteries are generally balanced, or are at least within a threshold level relative to one another (e.g., the difference in SOCs might be less than a 5% difference).

There are a number of reasons as to why the SOCs might be different. Because the battery units are distributed, one battery unit might be discharged more than the other. One battery unit might discharge more because of the high resistance wire. One battery may be hotter than the other which causes the hotter battery to discharge faster. Different loads may also have been placed on the different battery units. As such, there is no guarantee that the SOCs of the different batteries will remain constant relative to one another. The embodiments are configured to account for such differences.

Therefore, in response to the input 710A being received (i.e. input indicating an imbalance between the SOCs), the state machine 700 transitions to the negotiate 715 state. As a part of the negotiate 715 state, the charge controller of the battery-operated device (e.g., charge controller 565) negotiates with the flash charger (e.g., perhaps the flash charger MCU 520) to select a charge voltage that will be used to charge whichever battery is less charged. As an example, suppose the first battery unit is less charged than the second battery unit. The charge controller and the flash charger communicate with one another to select a charge voltage that will be used to bring the charge level of the first battery unit up to a level that is similar to the level of the second battery unit. By following the top branch of the state machine 700, the charging system is focused on bringing the charge levels of the various batteries to substantially equal levels. The term "substantially" does not necessarily mean "exact;" rather, the term allows some flexibility in interpretation. That is, the term "substantially" indicates an intention that whatever is subsequently being qualified with "substantially" should not be read as being literal but rather should be viewed as being close to, near, or approximate.

Input 715A then includes an input indicating that the charging of the first battery unit has commenced. After a determined period of time (e.g., perhaps 1 second, 2, seconds, 3, 4, 5, 6, 7, 8, 9, or 10 seconds), the state machine 700 transitions to the check charge current (CC) 720 state where the charge current of the first battery unit is examined to determine its level.

The charge current is checked because of the use of the high resistance wire. For instance, if the voltage was set to be equal to the first battery's voltage, or perhaps even slightly higher than the first battery's voltage, then it is actually the case that the charge current would be lower than anticipated because of the interconnect between the two devices (i.e. the high resistance wire). In fact, the voltage actually drops as the first battery unit charges. As such, the embodiments periodically check the actual charge current.

Input 720A includes an input indicating that the charge current is too low. As a result, the embodiments renegotiate to select a new charging voltage, one that is likely higher than the previous charging voltage. This back-and-forth cycle can happen any number of times during the charging process.

The input 720B refers to an input indicating that the difference in the SOCs between the various battery units now no longer exceeds the threshold mentioned previously. In other words, the charge levels of the batteries are now substantially balanced, but the battery units can still be charged.

The input 720C refers to an input indicating that the battery units are substantially balanced and sufficiently charged (e.g., the charge level has reached a threshold charge level). As a result, the charge controller can instruct the flash charger to enter a constant voltage (CV) mode 725. In the CV mode 725, a constant voltage is applied to charge the batteries until a terminal voltage level (e.g., between about 4.20 V and 4.45 V) is reached.

In response to input 720B, the state machine 700 returns to the check SOC 710 state. While in this state, the input 710B refers to an input indicating that the difference in SOCs between the various battery units is less than a threshold difference, meaning that the charge levels of the battery units are substantially balanced. In response to input 710B, the state machine 700 transitions to the negotiate 730 state.

This negotiation process includes the charge controller communicating with the flash charger to cause the flash charger to provide a charge voltage that will be used to charge, substantially in parallel, both the first battery unit and the second battery unit. The input 730A includes an input indicating that the parallel charging of the battery units has commenced.

After a determined period of time (e.g., perhaps 1 second, 2, seconds, 3, 4, 5, 6, 7, 8, 9, or 10 seconds), the state machine 700 transitions to the check charge current (CC) 735 state where the charge currents of the battery units are examined to determine their respective levels.

If the voltage was set to be equal to the two batteries' voltages, or perhaps even slightly higher than the two batteries' voltages, then it is actually the case that the charge currents would be lower than anticipated because of the interconnect between the two devices (i.e. the high resistance wire). As mentioned previously, the voltage actually drops as the two battery units are charged. As such, the embodiments periodically check the actual charge currents of the battery units to determine whether a higher voltage is warranted.

Input 735A includes an input indicating that the charge currents are too low. As a result, the embodiments renegotiate to select a new charging voltage, one that is likely higher than the previous charging voltage. This back-and-forth cycle can happen any number of times during the charging process.

The input 735B refers to an input indicating that the battery units are substantially balanced and sufficiently charged (e.g., the charge levels have reached a threshold charge level). As a result, the charge controller can instruct the flash charger to enter a constant voltage (CV) mode 725. In the CV mode 725, a constant voltage is applied to charge the batteries until the terminal voltage levels for the battery units are reached.

Input 725A refers to an input indicating that the terminal voltage levels of the batteries have been reached. As a result of receiving this input 725A, the state machine 700 transitions to the not charging 740 state. Similarly, the input 710C, when received in the check SOC 710 state, also transitions to the not charging 740 state.

The input 740A refers to an input indicating that the high resistance wire has been disconnected from one or both of the two devices (i.e. the battery-operated device and/or the flash charger). As a result of receiving the input 740A, the state machine 700 transitions to the disconnected 705 state.

In this manner, the embodiments can perform operations to balance the SOCs between multiple batteries. Once balanced, then those batteries can be charged in parallel.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
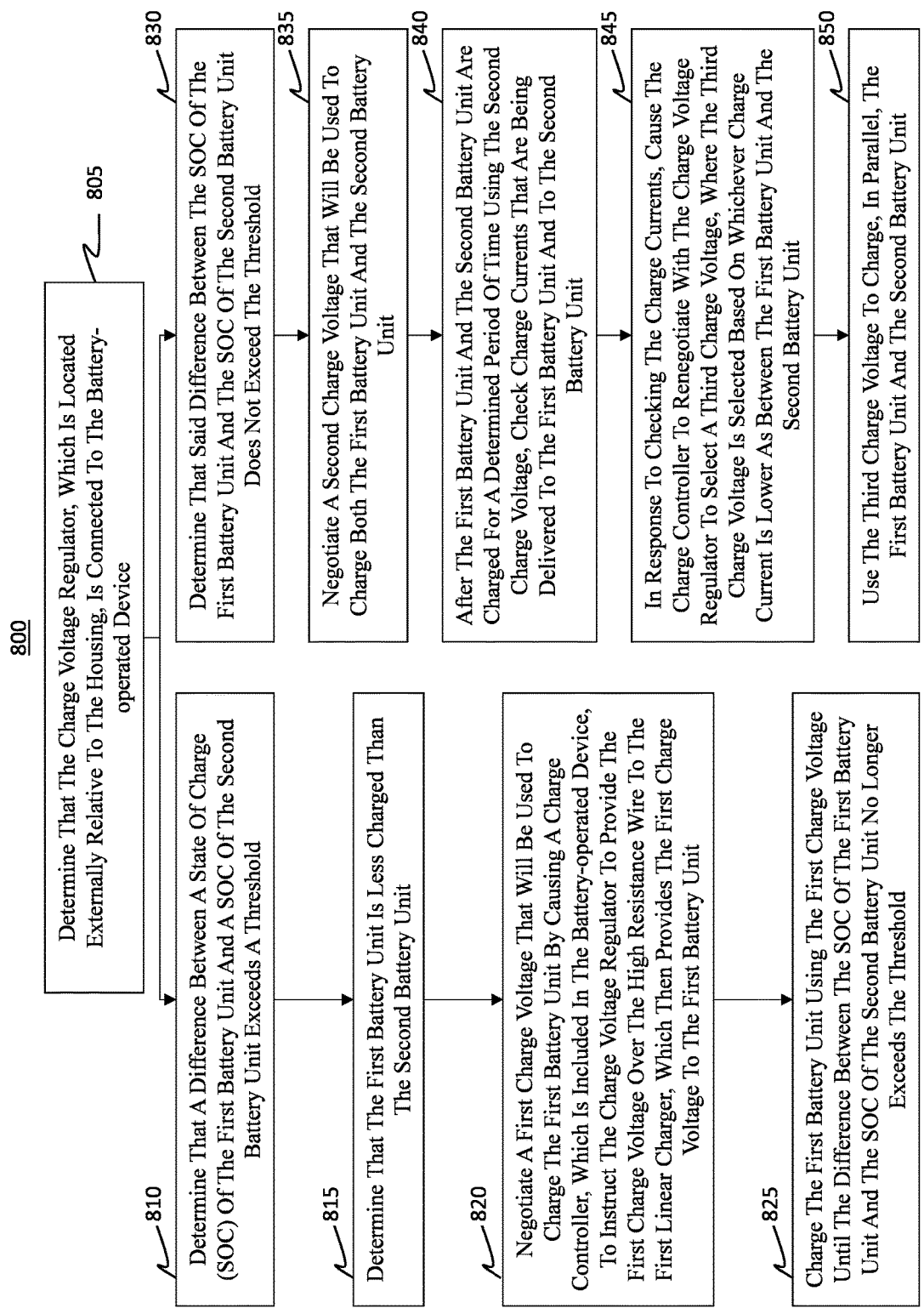
FIG. 8 illustrates a flowchart of an example method describing operations performed by the system.

Attention will now be directed to FIG. 8, which illustrates a flowchart of an example method 800 for rapidly charging a battery-operated device that includes multiple, distributed batteries and for reducing a power charging loss at the battery-operated device. Reducing the power charging loss at the battery-operated device is achieved by generating a rapid charge voltage at a charge voltage regulator, which is located externally relative to a housing of the battery-operated device, and by transmitting the rapid charge voltage over a high resistance wire that couples the charge voltage regulator to the battery-operated device.

Method 800 initially includes an act (act 805) of determining that the charge voltage regulator, which is located externally relative to the housing, is connected to the battery-operated device. Notably, the high resistance wire couples the charge voltage regulator to a first linear charger that is collocated with and coupled to a first battery unit. The high resistance wire further couples the charge voltage regulator to a second linear charger that is collocated with and coupled to a second battery unit. Furthermore, the first battery unit and the second battery unit are both disposed within the housing of the battery-operated device but are distributed relative to one another.

Method 800 includes an act (act 810) of determining that a difference between a state of charge (SOC) of the first battery unit and a SOC of the second battery unit exceeds a threshold. In some cases, the difference between the SOC of the first battery unit and the SOC of the second battery unit is greater than or equal to a 5% difference in SOC between the charge levels of the battery units. In some cases, the difference can be based on a predefined voltage difference, such as perhaps 100 milli-volt difference or some other selected value.

In response to act 810, act 815 includes determining that the first battery unit is less charged than the second battery unit. Stated differently, the first battery unit has a lower SOC than the second battery unit. While the current discussion is focused on the first battery unit being lower than the second, one will appreciate how the principles equally apply to the scenario where the second battery unit is lower than the first.

Act 820 includes negotiating a first charge voltage that will be used to charge the first battery unit. This negotiation is performed by causing the charge controller, which is included in the battery-operated device, to instruct the charge voltage regulator, which is located externally relative to the device's housing, to provide the first charge voltage over the high resistance wire to the first linear charger. The first linear charger then provides the first charge voltage to the first battery unit to charge that unit.

Act 825 includes charging the first battery unit using the first charge voltage until the difference between the SOC of the first battery unit and the SOC of the second battery unit no longer exceeds the threshold. In effect, acts 810 to 825 generally describe the top loop of the state machine 700 of FIG. 7.

After charging the first battery unit for a determined period of time using the first charge voltage (e.g., perhaps every 10 seconds, or some other selected time period during the charging process), method 800 can further include (though it is not illustrated in FIG. 8) an act of checking a charge current that is being delivered to the first battery unit. In response to determining that the charge current is below a charge current set point, the method can include causing the charge controller to renegotiate with the charge voltage regulator to select a new charge voltage, which is higher than the first charge voltage that was previously provided. The charge voltage regulator then provides the new charge voltage to the first battery unit. Again, such processes generally describe the top loop in the state machine 700. The current may have dropped due to the high resistance wire as well as due to the battery being charged. Thus, an increased voltage may be needed to ensure the charge current remains at the desired level.

After the new charge voltage is provided to the first battery unit, the method can further include checking a current voltage level of the first battery unit. In response to determining that the current voltage level of the first battery unit has reached a terminal voltage level, the charge voltage regulator can enter a constant voltage mode to subsequently charge the first battery unit. Such operations are represented by the CV mode 725 in FIG. 7.

In contrast to act 810, act 830 includes determining that the difference between the SOC of the first battery unit and the SOC of the second battery unit does not exceed the threshold such that the SOC of the first battery unit and the SOC of the second battery unit are substantially balanced. As an example, the difference between the SOC of the first battery unit and the SOC of the second battery unit can be less than a 5% difference in SOC. Of course, other thresholds can be used, such as perhaps one battery's charge is greater than 100 milli-volts different than the other battery's charge.

In response to act 830, act 835 includes negotiating a second charge voltage that will be used to charge both the first battery unit and the second battery unit.

After the first battery unit and the second battery unit are charged for a determined period of time using the second charge voltage (i.e. they are charged in parallel with one another), act 840 includes checking charge currents that are being delivered to the first battery unit and to the second battery unit.

In response to checking the charge currents, act 845 includes causing the charge controller to renegotiate with the charge voltage regulator to select a third charge voltage, where the third charge voltage is selected based on whichever charge current is lower as between the first battery unit and the second battery unit. The third charge voltage is higher than second charge voltage, thereby resulting in the charge currents also being increased. It is desirable to select charge voltages and charge currents in a manner so that while the batteries are being charged, their SOCs do not diverge and they are charged equally and will not again result in a scenario where an imbalance occurs.

Act 850 then includes using the third charge voltage to charge, in parallel, the first battery unit and the second battery unit. Acts 830 to 850 generally describe the bottom loop of the state machine 700 of FIG. 7.

The method can further include determining that a current voltage level of the first battery unit has reached a terminal voltage level and determining that a current voltage level of the second battery unit has reached the terminal voltage level. The charge voltage regulator can then enter a constant voltage mode to subsequently charge the first battery unit and the second battery unit.

The charge voltage regulator can cease charging the first battery unit and the second battery unit when a charge current of the first battery unit is less than a terminal current level and when a charge current of the second battery unit is less than the terminal current level.

Accordingly, the disclosed embodiments beneficially improve flash charging by enabling the rapid charge of multiple batteries. The embodiments also improve how distributed batteries are charged by relocating the charge voltage regulator out of the device that is being charged to a location that is external to that device. By doing so, the embodiments can ensure that the temperature profile of the device remains relatively stable while the device is being charged.

To achieve these benefits, a charge controller notes each battery voltage. The charge controller sets the flash charger output voltage at the lowest battery voltage. The charge controller monitors the voltage at the lowest battery voltage. Due to DC resistance (DCR) drops, the charge controller will communicate with the flash charger to set a higher output voltage until the minimum head room is reached. The charge controller continues to raise the voltage as the battery charges to maintain the minimum head room. Once the charge controller raises the voltage to maintain the minimum headroom on the second battery, that linear charger starts charging. The controller then compensates for the additional load caused by the second battery now charging. The charge controller continues to raise the voltage until the maximum flash charging voltage is reached, or both batteries reach their float voltage.

Example Computer/Computer Systems

Figure 9:
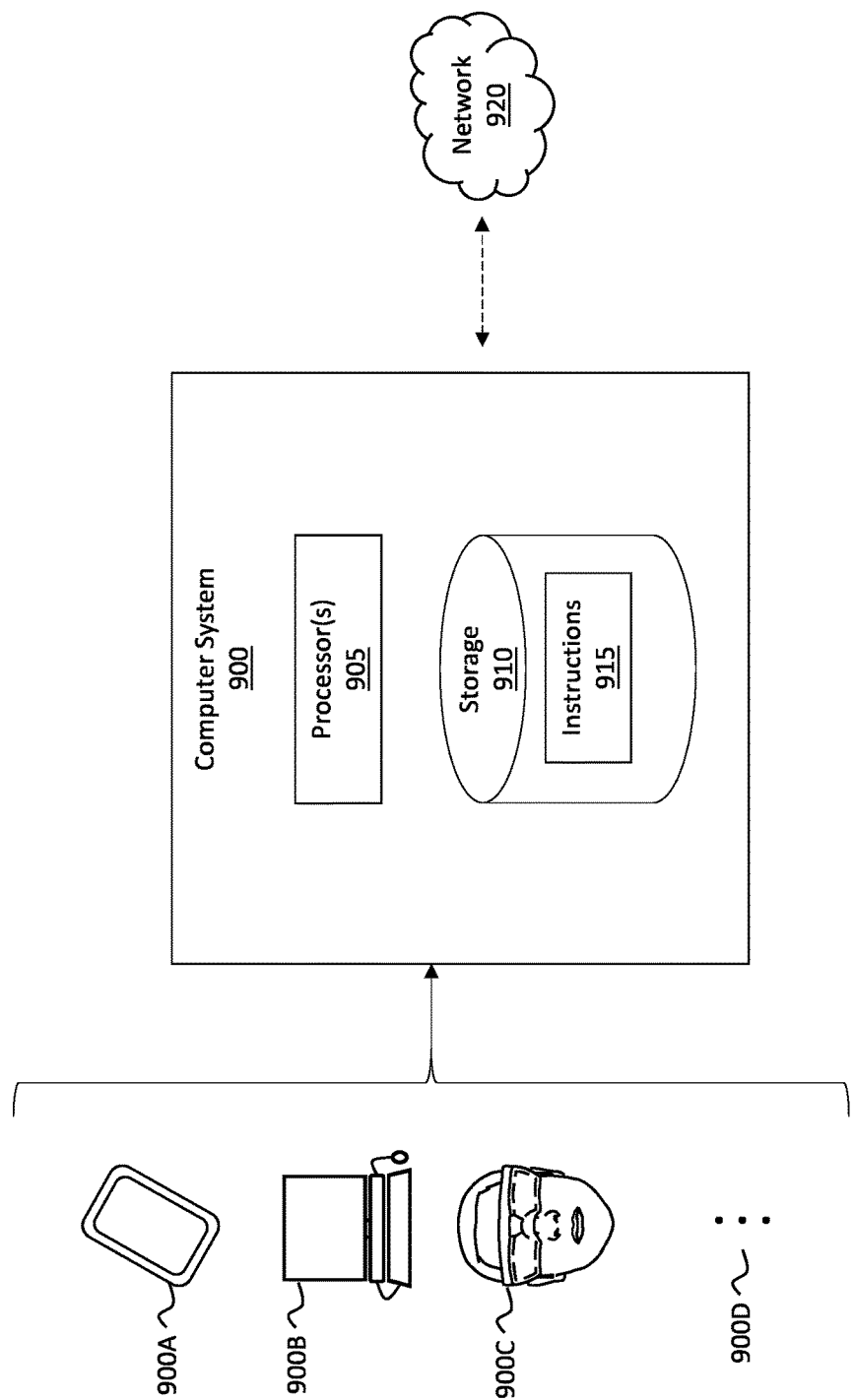
FIG. 9 illustrates an example computer system that can be configured to perform any of the disclosed operations.

Attention will now be directed to FIG. 9 which illustrates an example computer system 900 that may include and/or be used to perform any of the operations described herein. Computer system 900 may take various different forms. For example, computer system 900 may be embodied as a tablet 900A, a desktop or a laptop 900B, a wearable device 900C (e.g., any of the HMDs discussed herein), a mobile device, or any other standalone device, as represented by the ellipsis 900D. Computer system 900 may also be a distributed system that includes one or more connected computing components/devices that are in communication with computer system 900.

In its most basic configuration, computer system 900 includes various different components. FIG. 9 shows that computer system 900 includes one or more processor(s) 905 (aka a "hardware processing unit") and storage 910.

Regarding the processor(s) 905, it will be appreciated that the functionality described herein can be performed, at least in part, by one or more hardware logic components (e.g., the processor(s) 905). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 900. The different components, modules, engines, and services described herein may be implemented as objects or processors that execute on computer system 900 (e.g. as separate threads).

Storage 910 may be physical system memory, which may be volatile, non-volatile, or some combination of the two. The term "memory" may also be used herein to refer to non-volatile mass storage such as physical storage media. If computer system 900 is distributed, the processing, memory, and/or storage capability may be distributed as well.

Storage 910 is shown as including executable instructions 915. The executable instructions 915 represent instructions that are executable by the processor(s) 905 of computer system 900 to perform the disclosed operations, such as those described in the various methods.

The disclosed embodiments may comprise or utilize a special-purpose or general-purpose computer including computer hardware, such as, for example, one or more processors (such as processor(s) 905) and system memory (such as storage 910), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 900 may also be connected (via a wired or wireless connection) to external sensors (e.g., one or more remote cameras) or devices via a network 920. For example, computer system 900 can communicate with any number devices or cloud services to obtain or process data. In some cases, network 920 may itself be a cloud network. Furthermore, computer system 900 may also be connected through one or more wired or wireless networks to remote/separate computer systems(s) that are configured to perform any of the processing described with regard to computer system 900.

A "network," like network 920, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 900 will include one or more communication channels that are used to communicate with the network 920. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A multi-battery flash charging system configured to reduce a power charging loss at a battery-operated device that includes multiple, distributed batteries, where reducing the power charging loss at the battery-operated device is achieved by generating a charge voltage at a charge voltage regulator, which is located externally relative to a housing of the battery-operated device, and by transmitting the charge voltage over a high resistance wire that couples the charge voltage regulator to the battery-operated device, said multi-battery flash charging system comprising:
    a battery-operated device comprising:
        a first linear charger collocated with and coupled to a first battery unit of the battery-operated device; and
        a second linear charger collocated with and coupled to a second battery unit of the battery-operated device, wherein the second battery unit is separated from the first battery unit within a housing of the battery-operated device such that the first battery unit and the second battery unit are distributed relative to one another in the housing of the battery-operated device;
    a flash charger comprising a charge voltage regulator, wherein the flash charger is pluggable into a power grid to provide a rapid charging voltage to the battery-operated device to rapidly charge the first battery unit and the second battery unit, and wherein the flash charger, which includes the charge voltage regulator, is located externally relative to the housing of the battery-operated device; and
    a high resistance wire that is detachable from the battery-operated device and that, when attached to the battery-operated device, is coupled to (i) the first linear charger, (ii) the second linear charger, and (iii) the charge voltage regulator, and wherein the rapid charging voltage is delivered from the externally located charge voltage regulator to the first linear charger and to the second linear charger via the high resistance wire.

2. The system of claim 1, wherein the charge voltage regulator includes a direct current (DC)-to-DC converter.

3. The system of claim 1, wherein, as a result of regulating the rapid charging voltage externally relative to the housing of the battery-operated device, a temperature profile of the battery-operated device has a smaller temperature gradient as compared to a temperature profile of a different device in which said device's rapid charging voltage is regulated within a housing of said device.

4. The system of claim 1, wherein the high resistance wire is coupled to the battery-operated device via a universal serial bus (USB) C connector.

5. The system of claim 1, wherein the charge voltage regulator, which is located externally relative to the housing of the battery-operated device, has about a 5% to 25% efficiency loss in generating the rapid charging voltage.

6. The system of claim 1, wherein a resistance of the high resistance wire is about 100 milli-ohms.

7. The system of claim 1, wherein the multi-battery flash charging system further includes a first set of sensors that monitors a first voltage of the first battery unit, a first current of the first battery unit, and a first temperature of the first battery unit, and
    wherein the multi-battery flash charging system further includes a second set of sensors that monitors a second voltage of the second battery unit, a second current of the second battery unit, and a second temperature of the second battery unit.

8. A method for rapidly charging a battery-operated device that includes multiple, distributed batteries and for reducing a power charging loss at the battery-operated device, where reducing the power charging loss at the battery-operated device is achieved by generating a rapid charge voltage at a charge voltage regulator, which is located externally relative to a housing of the battery-operated device, and by transmitting the rapid charge voltage over a high resistance wire that couples the charge voltage regulator to the battery-operated device, said method comprising:
    determining that the charge voltage regulator, which is located externally relative to the housing, is connected to the battery-operated device, wherein:
        the high resistance wire couples the charge voltage regulator to a first linear charger that is collocated with and coupled to a first battery unit,
        the high resistance wire further couples the charge voltage regulator to a second linear charger that is collocated with and coupled to a second battery unit, and
        the first battery unit and the second battery unit are both disposed within the housing of the battery-operated device but are distributed relative to one another;
    in response to determining that a difference between a state of charge (SOC) of the first battery unit and a SOC of the second battery unit exceeds a threshold, performing the following:
        determine that the first battery unit is less charged than the second battery unit;
        negotiate a first charge voltage that will be used to charge the first battery unit by causing a charge controller, which is included in the battery-operated device, to instruct the charge voltage regulator to provide the first charge voltage over the high resistance wire to the first linear charger, which then provides the first charge voltage to the first battery unit; and charge the first battery unit using the first charge voltage until the difference between the SOC of the first battery unit and the SOC of the second battery unit no longer exceeds the threshold.

9. The method of claim 8, wherein, after charging the first battery unit for a determined period of time using the first charge voltage, said method further includes:
checking a charge current that is being delivered to the first battery unit;
in response to determining that the charge current is below a charge current set point, causing the charge controller to renegotiate with the charge voltage regulator to select a second charge voltage, which is higher than the first charge voltage that was previously provided; and
causing the charge voltage regulator to provide the second charge voltage to the first battery unit.

10. The method of claim 9, wherein, after the second charge voltage is provided to the first battery unit, said method further includes:
checking a current voltage level of the first battery unit; and
in response to determining that the current voltage level of the first battery unit has reached a terminal voltage level, causing the charge voltage regulator to enter a constant voltage mode to subsequently charge the first battery unit.

11. The method of claim 8, wherein in response to determining that said difference between the SOC of the first battery unit and the SOC of the second battery unit does not exceed the threshold such that the SOC of the first battery unit and the SOC of the second battery unit are substantially balanced, said method further includes:
negotiating a third charge voltage that will be used to charge both the first battery unit and the second battery unit;
after the first battery unit and the second battery unit are charged for a determined period of time using the third charge voltage, checking charge currents that are being delivered to the first battery unit and to the second battery unit;
in response to checking the charge currents, causing the charge controller to renegotiate with the charge voltage regulator to select a fourth charge voltage, where the fourth charge voltage is selected based on whichever charge current is lower as between the first battery unit and the second battery unit; and
using the fourth charge voltage to charge, in parallel, the first battery unit and the second battery unit.

12. The method of claim 11, wherein the method further includes:
determining that a current voltage level of the first battery unit has reached a terminal voltage level;
determining that a current voltage level of the second battery unit has reached the terminal voltage level; and
causing the charge voltage regulator to enter a constant voltage mode to subsequently charge the first battery unit and the second battery unit.

13. The method of claim 12, wherein the charge voltage regulator ceases charging the first battery unit and the second battery unit when a charge current of the first battery unit is less than a terminal current level and when a charge current of the second battery unit is less than the terminal current level.

14. The method of claim 8, wherein the difference between the SOC of the first battery unit and the SOC of the second battery unit is greater than or equal to a 5% difference in SOC.

15. The method of claim 8, wherein a resistance of the high resistance wire is greater than 50 milli-ohms.

16. A method for rapidly charging a battery-operated device that includes multiple, distributed batteries and for reducing a power charging loss at the battery-operated device, where reducing the power charging loss at the battery-operated device is achieved by generating a rapid charge voltage at a charge voltage regulator, which is located externally relative to a housing of the battery-operated device, and by transmitting the rapid charge voltage over a high resistance wire that couples the charge voltage regulator to the battery-operated device, said method comprising:
determining that the charge voltage regulator, which is located externally relative to the housing, is connected to the battery-operated device, wherein:
the high resistance wire couples the charge voltage regulator to a first linear charger that is collocated with and coupled to a first battery unit,
the high resistance wire further couples the charge voltage regulator to a second linear charger that is collocated with and coupled to a second battery unit, and
the first battery unit and the second battery unit are both disposed within the housing of the battery-operated device but are distributed relative to one another;
in response to determining that a difference between a state of charge (SOC) of the first battery unit and a SOC of the second battery unit does not exceed a threshold such that the SOC of the first battery unit and the SOC of the second battery unit are substantially balanced, performing the following:
negotiating a first charge voltage that will be used to charge both the first battery unit and the second battery unit;
after the first battery unit and the second battery unit are charged for a determined period of time using the first charge voltage, checking charge currents that are being delivered to the first battery unit and to the second battery unit;
in response to checking the charge currents, causing the charge controller to renegotiate with the charge voltage regulator to select a second charge voltage, where the second charge voltage is selected based on whichever charge current is lower as between the first battery unit and the second battery unit; and
using the second charge voltage to charge, in parallel, the first battery unit and the second battery unit.

17. The method of claim 16, wherein the method further includes:
determining that a current voltage level of the first battery unit has reached a terminal voltage level;
determining that a current voltage level of the second battery unit has reached the terminal voltage level; and
causing the charge voltage regulator to enter a constant voltage mode to subsequently charge the first battery unit and the second battery unit.

18. The method of claim 17, wherein the charge voltage regulator ceases charging the first battery unit and the second battery unit when a charge current of the first battery unit is less than a terminal current level and when a charge current of the second battery unit is less than the terminal current level.

19. The method of claim 16, wherein a resistance of the high resistance wire is greater than 75 milli-ohms.

20. The method of claim 16, wherein the difference between the SOC of the first battery unit and the SOC of the second battery unit is less than a 5% difference in SOC.

* * * * *